United States Patent

Chatani et al.

[11] Patent Number: 5,572,292
[45] Date of Patent: Nov. 5, 1996

[54] CARTRIDGE LIFE DETECTING SYSTEM

[75] Inventors: Kiyoshi Chatani; Masahiko Kitamura; Kazuhiro Yoshihara, all of Ebina, Japan

[73] Assignee: Fuji Xerox Co., Ltd., Tokyo, Japan

[21] Appl. No.: 420,004

[22] Filed: Apr. 11, 1995

[30] Foreign Application Priority Data

Apr. 12, 1994 [JP] Japan .................................. 6-073271

[51] Int. Cl.$^6$ ........................... G03G 15/00; G03G 21/00
[52] U.S. Cl. ................................................. 399/25; 399/29
[58] Field of Search ................................. 355/200, 203, 355/204, 206, 208, 209, 210

[56] References Cited

FOREIGN PATENT DOCUMENTS

| | | |
|---|---|---|
| 63-212956 | 9/1988 | Japan . |
| 1-43302 | 9/1989 | Japan . |
| 1-41985 | 9/1989 | Japan . |
| 3-243978 | 10/1991 | Japan . |

*Primary Examiner*—Arthur T. Grimley
*Assistant Examiner*—Sophia S. Chen
*Attorney, Agent, or Firm*—Finnegan, Henderson, Farabow, Garrett & Dunner, L.L.P.

[57] ABSTRACT

The present invention provides a cartridge life detecting system which detects and manages the life of a cartridge by mounting a memory on a print cartridge comprising at least an image formation member removably mounted on a main body of an image formation apparatus, carrying out operation to obtain information about the life of the cartridge based on contents read from the memory and criterial information of the life of the cartridge, and writing information about the life in the memory, comprises the steps of setting a value corresponding to the life of the cartridge by selecting one among combination of the number of printed sheets and the number of rotations of the image formation member, combination of the number of printed sheets and the number of pixels of image information, and combination of the number of printed sheets, the number of rotations of the image formation member and the number of pixels of image information, storing the value in the memory in advance, and making determination as to the life of the cartridge based on the value.

3 Claims, 8 Drawing Sheets

FIG. 9

CARTRIDGE LIFE DETECTING SYSTEM

BACKGROUND OF THE INVENTION

1. Field of the Invention

The present invention relates to a cartridge life detecting system and in particular relates to a system for appropriately performing detection of life of a print cartridge, which is removably mounted for using on the body of an image formation apparatus such as a copying machine, facsimile apparatus or printer, before problems such as defect in image quality occur.

2. Discussion of the Related Art

Recently, various types of electrophotographic image formation apparatus employing a print cartridge in which an image formation member such as a photoreceptor is removably and exchangeably mounted on the body of the apparatus have been proposed, because the print cartridge requires repairing or exchange by reason of life expiration or the like. Therefore, checking, repairing or exchange of consumables such as an image formation member can be easily carried out.

In order to use plural types of such cartridges in exchange with each other, an image formation apparatus comprising a memory means in a cartridge, means for reading or writing of the memory means in the image formation apparatus, control means for operating information related to the life of the cartridge based on the contents read out of the memory means and image-forming operation and for writing information in the memory means has been proposed to the purpose of simply and accurately detecting and managing information related to the life of each cartridge or the like (Japanese Patent Application Unexamined Publications Nos. Sho. 63-212956 (1988) and Hei. 3-243978 (1991)).

In these apparatuses, contents of image formation operation as criterial information related to the life of cartridge, namely, the number of printed sheets or pixels, are set as a predetermined value corresponding to the life. It is determined whether the number of the printed sheets or pixels in the image formation practice exceeds the predetermined value. If it does not exceed the predetermined value, information is written in the memory means to continue image formation, and if it exceeds the predetermined value, exchange of the cartridge is recommended to the user.

When the number of the printed sheets is utilized as criterial information related to the life of the cartridge, counting the number of the printed sheets is carried out by calculating the number of ejected printed sheets or by presuming the number of the printed sheets based on the number of rotations of the image formation member and a predetermined rate.

If a print cartridge, integrally having an image formation member and a cleaner which collects toner remaining on the surface of the image formation member and stores the collected toner in the image formation member is used, the amount of toner stored in the image formation member is limited by the capacity of the toner storing component of the image formation member, and besides, the amount increases in proportion to the number of the printed sheets or the like, or varies by various factors. Therefore, there are some cases where toner storing component of the image formation member is filled with toner before the life of the cartridge expires.

In general, the amount of collected toner is almost equivalent to the amount given by subtracting the amount of toner transferred to the sheet from the amount of toner attached to the image formation member by development of an electrostatic latent image. However, the ratio of the attached toner amount to the transferred toner amount, namely, the transfer rate is not always constant. Ordinarily it varies within a range from 10 to 20% in accordance with variation of the toner charge amount (variation mainly caused by conditions such as frictional charging or circumstances). The amount of toner used for development also varies about 20% depending on the toner charge amount. Consequently, the real amount of collected toner varies more greatly under the above influences. In addition, the density of the image to be formed greatly affects the amount of attached toner in every printing process and the amount of collected toner.

For the above reason, in the case of the cartridge which stores the collected toner in the image formation member, a sensor detects that the toner storing component of the image formation member is filled with toner and notifies the user the time for exchanging the cartridge. To be more detail, it is detected that the driving torque of an auger exceeds a predetermined value by a torque limiter method utilizing increase of rotation load in the auger for carrying toner collected by the cleaner to the storing component of the image formation member, and the time for exchanging the cartridge is determined in accordance with the detection signal.

However, in the system for detecting the life of the cartridge such as described above, setting of the number of the printed sheets or pixels, or the amount of collected toner as criterial information related to the life of the cartridge is only based on ordinary mode of use (single-side printing for A4 size), and a special mode of use is not supposed. Therefore, defect in the image quality or apparatus contamination occurs before the life of the cartridge expires if the apparatus is used in a special way, for example, continuous use in a super density image mode, or continuous use in a double-side printing mode.

That is, owing to overuse or irregular use, a photoconductive film of a photoconductor as the image formation member is worn out and the charging potential of the worn out portion decreases, and therefore balance among conditions of developing potential contrast is lost, and fogging, which means producing high background density, the defect in the image quality occurs. Because of continuous use of the apparatus in the super density image mode, the amount of the collected toner abruptly increases, and accordingly, the storing component of the image formation member is filled with toner and then toner overflows the storing component, thus sometimes contaminating the inside of the apparatus.

SUMMARY OF THE INVENTION

The present invention has been made in view of the above circumstances and has as an object of provision of a system for detecting life of cartridge which appropriately detects life of a print cartridge before problem such as the defect in the image quality occurs even in the case of a special way of use.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a cartridge life detecting system which detects and manages the life of a cartridge by mounting a memory on a print cartridge comprising at least an image formation member removably mounted on a main body of an image formation apparatus, carrying out operation to obtain information about the life of the cartridge based on contents read from the memory and criterial information of the life of the cartridge, and writing the information about the life in the memory, comprises the steps of setting a value corresponding to the life of the cartridge by selecting one among combination of the number of printed sheets and the number of rotations of the image formation member, combination of the number of printed sheets and the number of pixels of image information, and combination of the number of printed sheets, the number of rotations of the image formation member and the number of pixels of image information, storing the value in the memory in advance, and making determination as to the life of the cartridge based on the value.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENT

Preferred embodiment of a cartridge life detecting system according to the present invention is now described in detail based on the drawings.

First Embodiment

Figure 1:
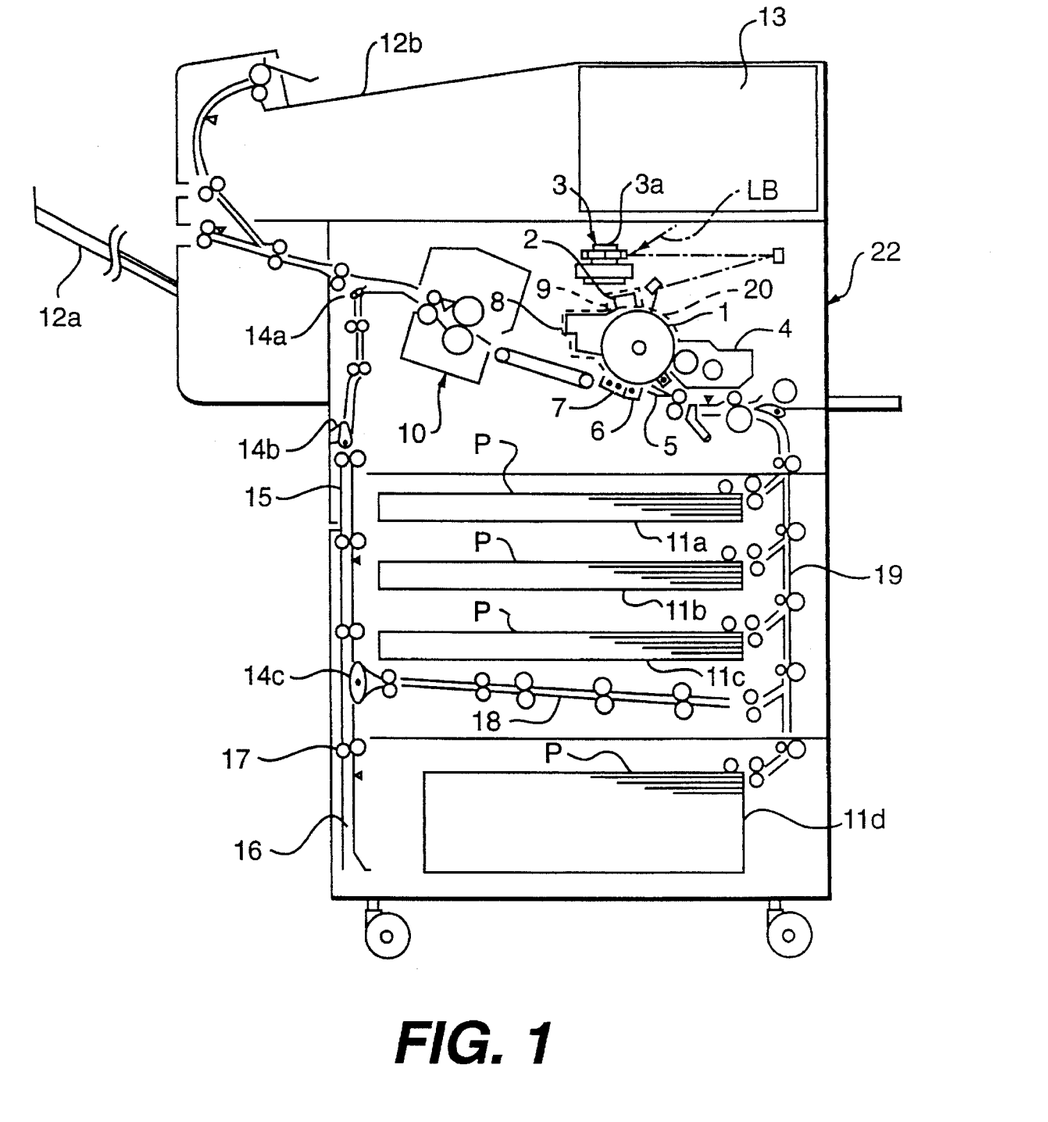
FIG. 1 is a schematic view of inside construction of an image formation apparatus according to the present invention.
Figure 2A:
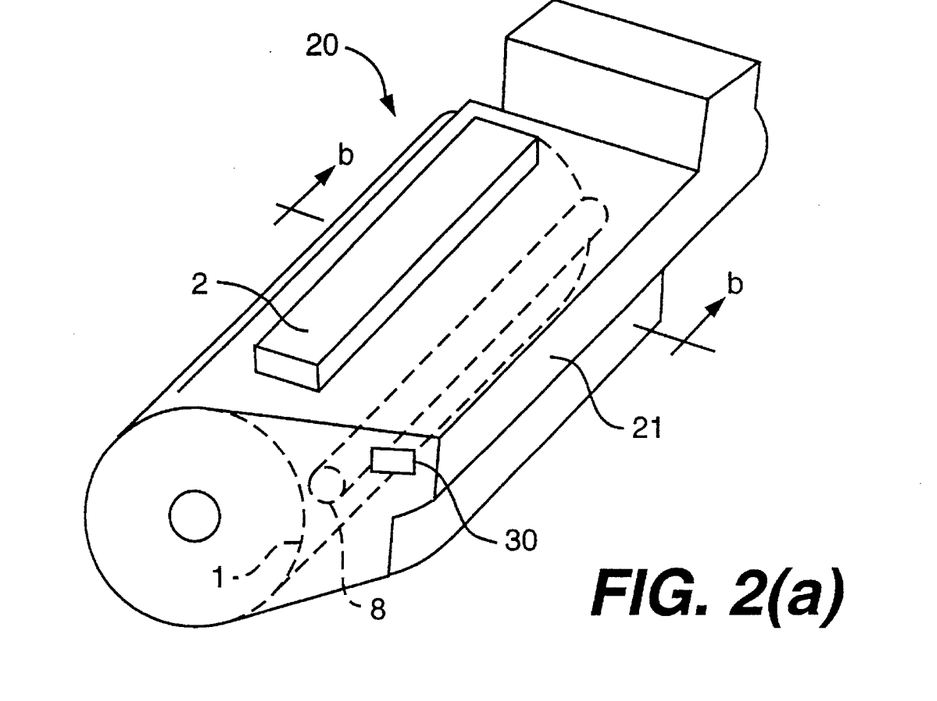
FIGS. 2(a) and 2(b) are a perspective view of an example of a print cartridge used in the apparatus shown in FIG. 1, and a partial cross-sectional view of the example of the print cartridge along the line b—b, respectively.
Figure 2B:
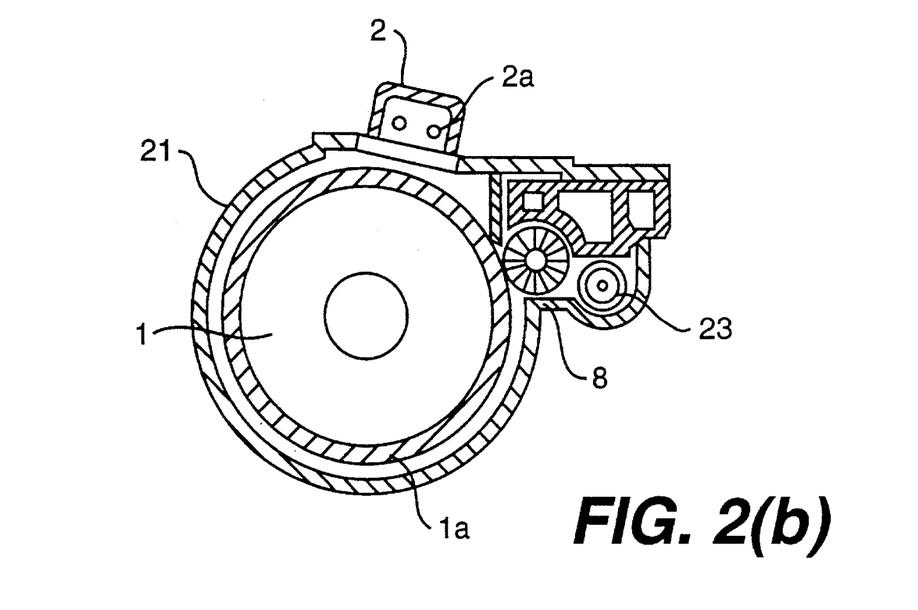
Figure 3:
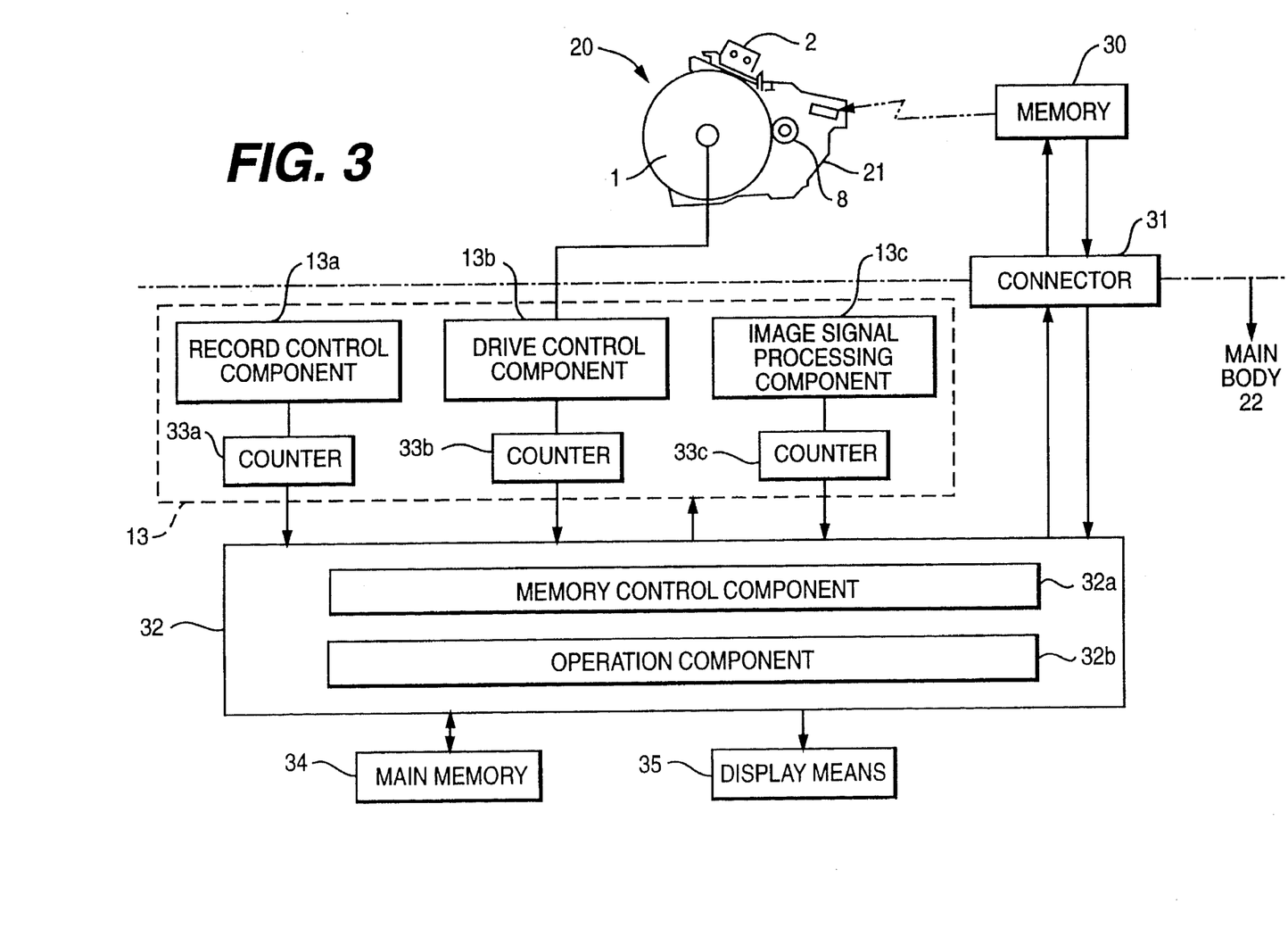
FIG. 3 is a block diagram showing a system of detecting the life of the print cartridge in the apparatus of FIG. 1.

FIGS. 1 through 3 show an embodiment of an image formation apparatus employing a system of the present invention: FIG. 1 shows inside construction of the image formation apparatus, FIG. 2 shows a print cartridge used in the image formation apparatus, and FIG. 3 shows the system of detecting the life of the cartridge in the image formation apparatus.

In FIG. 1, 1 is a photoconductive drum as an image formation member, and around the image formation member 1 are mounted a charge corotron 2, an image exposure component 3, a developing device 4, a pre-transfer corotron 5, a detach corotron 7, a transfer corotron 6, a cleaner 8 and an erase lamp 9 in this order, 10 is a fuser, 11a through 11d are paper cassettes for storing recording sheets P, 12a is a catch tray, 12b is a top tray, 13 is a control component including an image input component, an image signal processing component, a record control component, a drive control component or the like. In this apparatus, image information is input through a recording medium such as a magnetic disk or an optical disk, or an on-line system.

As shown in FIGS. 2(a) and 2(b), the image formation member 1, the cleaner 8 and the charge corotron 2 are integrally held in a unit case 21, thus constituting a print cartridge 20, which is removably mounted on the main body 22 of the apparatus for use. In the cartridge 20, toner remaining on the image formation member 1 is collected by the cleaner 8 and stored in the inside of the image formation member 1 by the auger 23 or the like.

Basically, this embodiment forms an electrostatic image by uniformly charging the surface of rotating image formation member 1 and by exposing the surface of the image formation member 1 to a laser beam LB irradiated from the image exposing component 3 and reflected on a polygonal mirror 3a or the like based on an image signal input and processed by the control component 13. After that, the electrostatic image is developed by the developing device 4 for generating a toner image, which is transferred by the transfer charger 6 to a recording sheet P carried from the predetermined paper cassette 11. The recording sheet P is carried to the fuser 10 for fusing the toner image, whereby the recording sheet P, on which the image is fused in accordance with image information, is ejected to the catch tray 12a or the top tray 12b. The toner remaining on the image formation member 1 is collected by the cleaner 8 and stored in the inside of the image formation member 1, and the image formation member 1 cleaned by the cleaner 8 is discharged by the erase lamp 9. In this way, one cycle of image formation process is finished.

This embodiment of the apparatus comprises an automatic double-side printing mechanism. That is, a recording sheet P, on one side of which an image is printed by the above-described image formation process, passes through the fuser 10, and the moving direction of the recording sheet P is changed to a carrying path 15 by gates 14a and 14b, and then carried to a printing surface reversing area 16 disposed at a lower part of the main body 22 of the apparatus. The recording sheet reversed in the printing surface reversing area 16 is carried to a double-side printing stand-by area 18 by a field roller 17 and a gate 14c, and in accordance with the timing of image formation, it is further carried to an image formation component including the image formation member 1 or the like through a carrying path 19. The toner image is transferred to the reversed side of the sheet, thus achieving the double-side printing.

FIG. 3 shows a system of detecting the life of the print cartridge in this apparatus.

As shown in this figure or in FIG. 2, at a predetermined position of the unit case 21 of the print cartridge 20, a memory 30 (for example, EEPROM) is disposed. In the main body of the apparatus 22, reading/writing means 31 (for example, a connector) is disposed at a position connectable to the memory 30 when the print cartridge 20 is mounted, and control means 32 for managing life of the cartridge connected to the reading/writing means is also disposed. The control means 32 comprises a memory control component 32a, an operation component 32b or the like. Data of the number of printed sheets counted by a counter 33a connected to a record control component 13a, data of the number of rotation of the image formation member counted by a counter 33b connected to a drive control component 13b, and data of the number of pixels counted by a dot counter 33c connected to an image signal processing component 13c are input to the control means 32. Furthermore, a main memory 34 for recording managing history mounted on the main body of the apparatus 22 and display means 35 for displaying information related to the life of the cartridge or exchange of the cartridge are connected to the control means 32.

In the memory 30 of the cartridge 20, the number of the printed sheets, the number of the rotation of the image formation member, and the number of pixels of image information are stored as criterial information related to the life of the cartridge. Among criterial information, the predetermined values of the number of rotation of the image formation member and the number of pixels of image information are set as follows. In this case, the predetermined value of the number of printed sheets is supposed to be 50,000.

The predetermined value of the number of rotation of the image formation member is set based on the minimum thickness of the film of the image formation member necessary to maintain the image quality.

Figure 4:
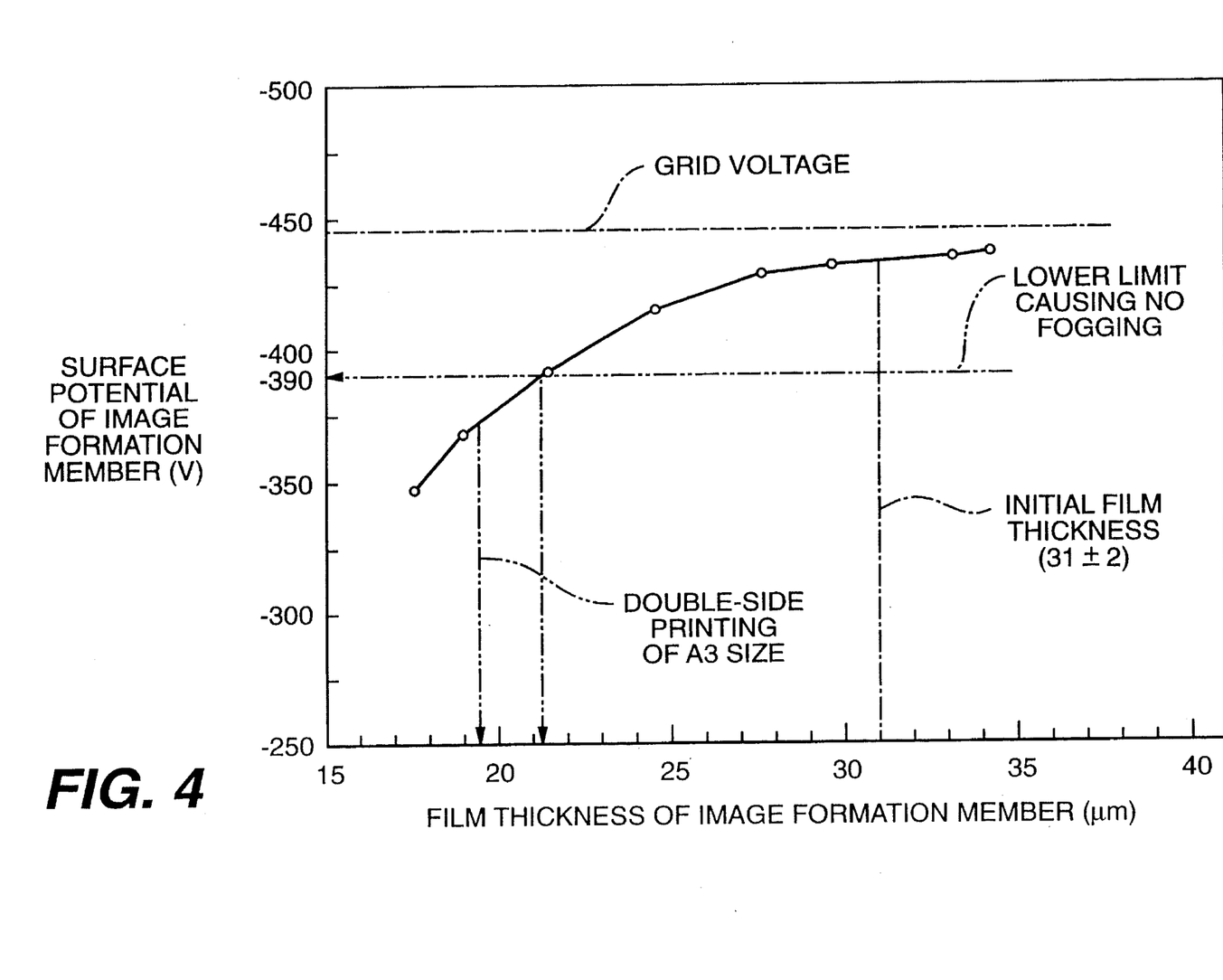
FIG. 4 is a graph showing relation between the thickness of a film of an image formation member of the apparatus of FIG. 1 and the surface potential thereof.

There is relation shown in FIG. 4 between the film thickness of the image formation member and the surface (charging) potential. An organic photoconductive drum is used as the image formation member 1, and therefore its film thickness is equivalent to the thickness of the photoconductive layer 1a of FIG. 2(b). The data is obtained under the condition that a charging device corresponding to the primary charger having a grid 2a which is advantageous to stabilization of the charging potential is used, and moreover, the open rate of the grid 2a is set to the most appropriate value confirmed by a test of charging potential maintenance. An initial value of the film thickness 1a of the photoconductive member is 31±2 μm, the grid voltage is −442.5 V, and at that time, lower limitation of the surface potential value of the image formation member necessary to prevent occurrence of fogging is −390 V.

Figure 5:
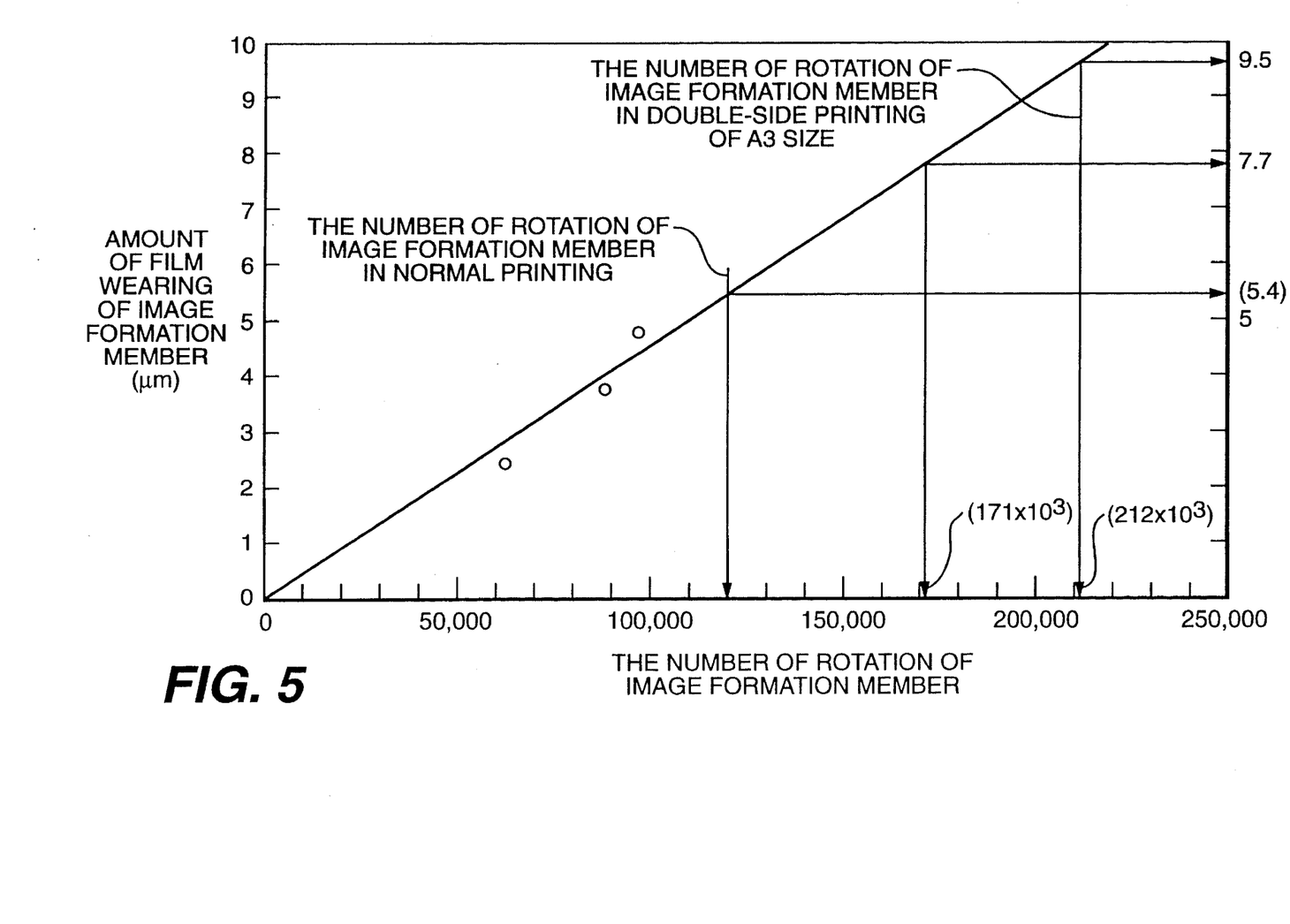
FIG. 5 is a graph showing relation between the number of rotation of the image formation member of the apparatus of FIG. 1 and the worn film thickness of the image formation member.

There is relation shown in FIG. 5 between the number of rotation of the image formation member and the amount of wear thereof. This data is prepared based on estimation data supposing that the number of printed sheets is 50,000.

Here, the values are set based on the data shown in FIGS. 4 and 5, supposing the case of 50,000 sheets double-side printing for A3 size as a particular way of use. In this case, the number of rotation of the image formation member is 212,000, and in accordance with FIG. 5, worn film thickness is .9.5 μm at that time. By applying the value to the graph in FIG. 4, it is given that the surface potential of the image formation member when wear of film occurs is about −370 V, which is a potential area where fogging occurs. Based on the data of FIG. 4, the lower limit of the value of film thickness required to prevent occurrence of fogging is 21.3 μm; therefore the difference between a value given by subtracting a tolerance (2 μm) from the initial value of film thickness of the image formation member (31 μm) and the above-described lower limit, namely, 7.7 μm is the upper limit of the worn film thickness for this image formation member which causes no fogging. When the worn film thickness is equivalent to the upper limit 7.7 μm, the number of rotation is 171,000 according to the graph in FIG. 5, which is the upper limit of the number of rotation causing no fogging. Consequently, the upper limit of the number of rotation is regarded as the criterial value of the life of the cartridge determined by the number of rotation of the image formation member.

The set value of the number of pixels of image information is determined based on an acceptable amount of the collected toner.

Figure 6:
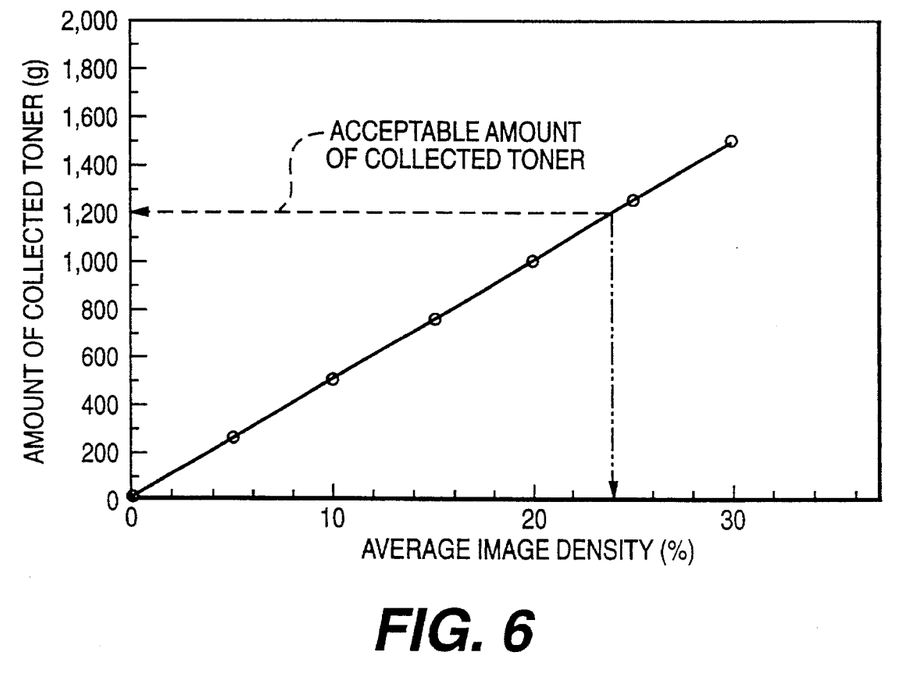
FIG. 6 is a graph showing relation between the average image density and the amount of collected toner.

There is relation shown in FIG. 6 between an average image density of image information in A4 size and the amount of the collected toner when 50,000 sheets printing is supposed. The acceptable amount of the toner collected in the image formation member is 1,200 g, and therefore, a largest value of average image density possible in 50,000 sheets printing is 24%.

Figure 7:
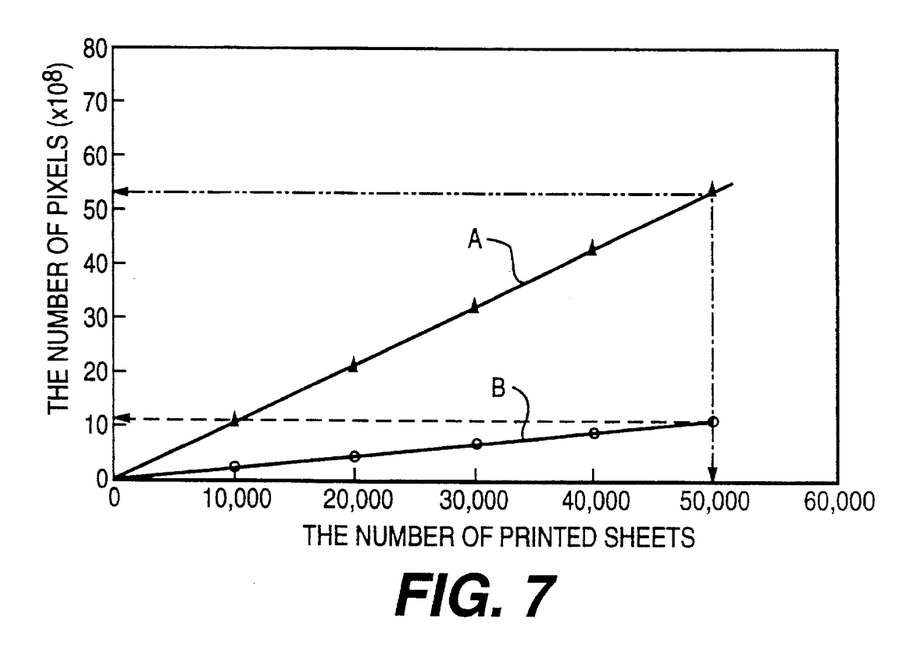
FIG. 7 is a graph showing relation between the number of printed sheets and the number of pixels.

There is relation shown in FIG. 7 between the number of printed sheets and the number of pixels of image information. In FIG. 7, the solid line A indicates data in the case where the average image density is 24% and the solid line B indicates data in the case of a normal average image density value (5%). Here, the number of pixels is a value representing information (the number of pixels) of an image to be formed counted by a unit of the number of pixels per 10 milliseconds.

According to the data in FIGS. 6 and 7, the number of pixels corresponding to the largest amount of collected toner without overflowing toner from the storing component of the image formation member is $53 \times 10^8$ in 50,000 sheets printing. Therefore, the above-described number of pixels which can prevent the overflow of collected toner is regarded as a criterial value of the life of the cartridge determined by the number of pixels of image information. In this connection, the upper limit of the number of pixels within the range for preventing collected toner overflow in 50,000 sheets printing in normal printing operation (5% image density value) is $11 \times 10^8$.

In this cartridge life detecting system, a message for calling user's attention to exchanging print cartridge, "1st warning", "2nd warning" or "End of life (stop using)" is displayed on the displaying means 35 based on set value distinction shown in the table below, whereby the state of the life of the cartridge is notified to the user. The set value for "1st warning" corresponds to 80% of the value for "End of life", and the set value for "caution" corresponds to 90% of the value for "End of life",

|  | 1st warning | 2nd warning | End of life |
| --- | --- | --- | --- |
| The number of printed sheets | 40,000 | 45,000 | 50,000 |
| The number of rotation of image formation member | 137,000 | 154,000 | 171,000 |
| The number of pixels of image information | $42.4 \times 10^8$ | $47.7 \times 10^8$ | $53 \times 10^8$ |

Figure 8:
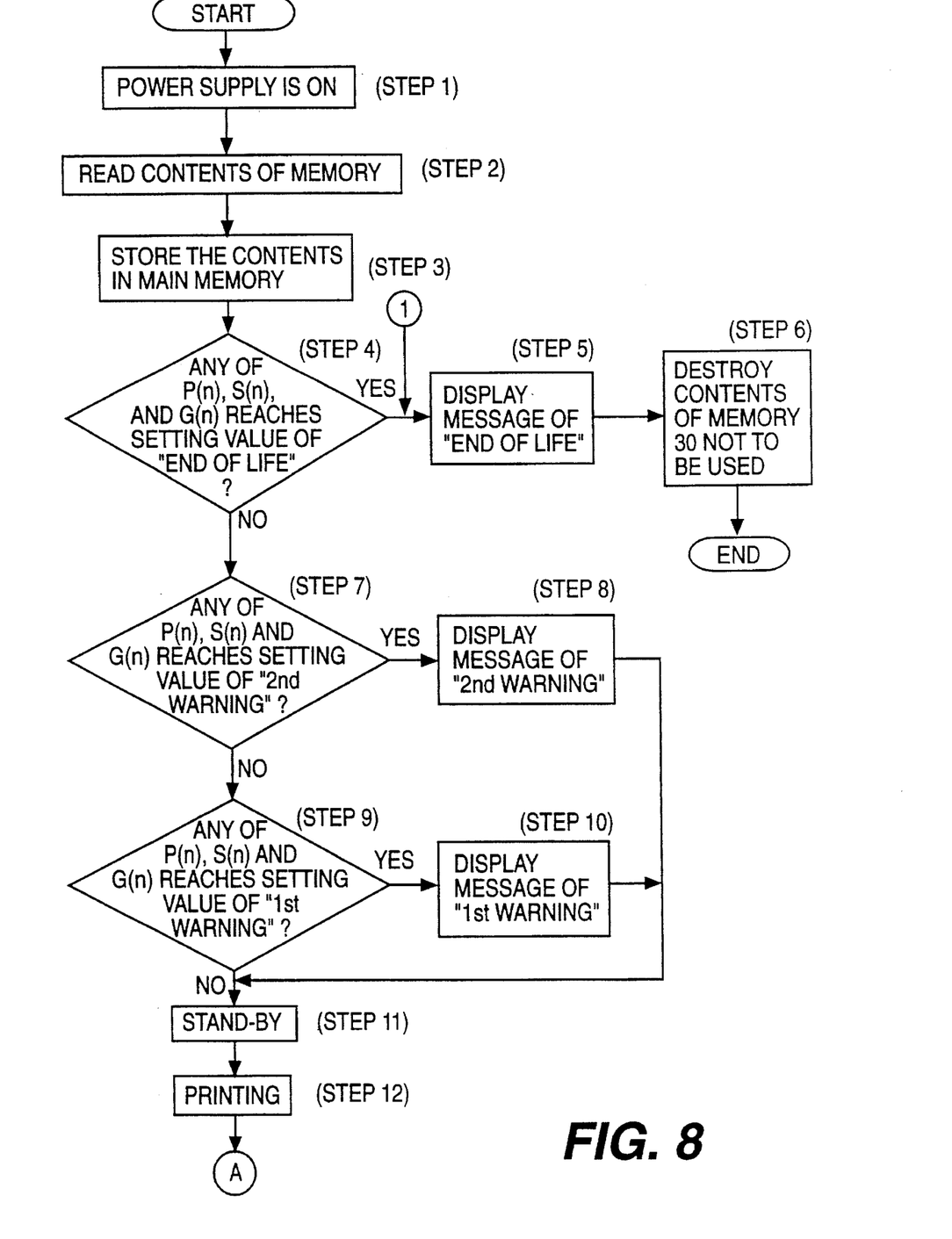
FIGS. 8 and 9 are flow charts showing operations of a control component of the cartridge life detecting system.
Figure 9:
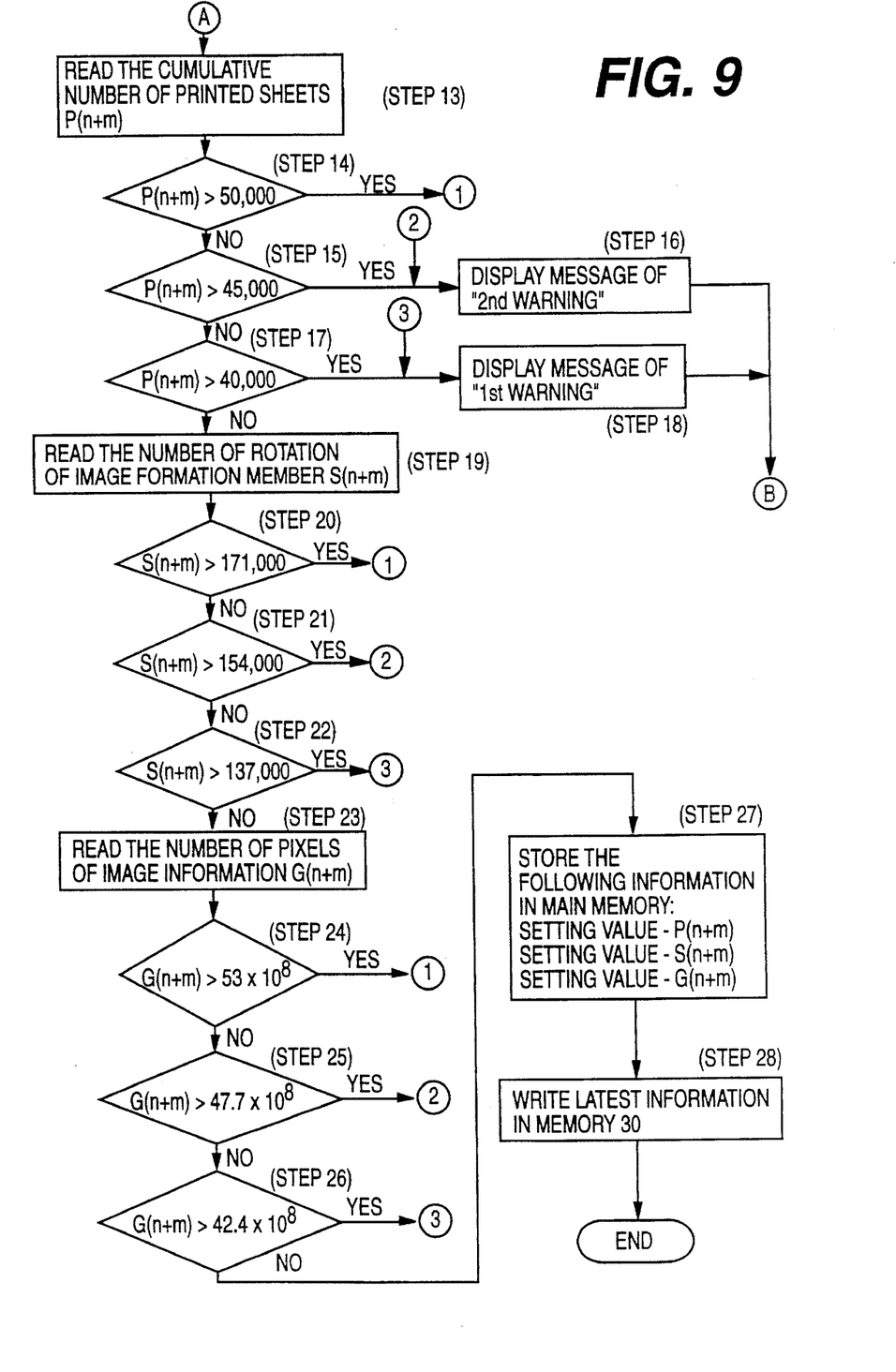

Operation of the control means (procedure) in the life detecting system is now described based on FIGS. 8 and 9.

A power supply of the apparatus is turned to be on in step 1, and in step 2, criterial information of the life of the cartridge, the number of printed sheets P(n), the number of rotation of the image formation member S(n), and the number of pixels of image information G(n) at the present time are read from the memory 30 of the cartridge 20 by the reading/writing means 31, and are stored in the main memory 34 through the control means 32 in step 3.

In step 4, the control means 32 makes determination as to whether any of P(n), S(n) and G(n) which have been read reaches the set value of "End of life", and if at least one of them reaches the set value, the process proceeds to step 5 to output and display the message "End of life" on the display means 35, and further proceeds to step 6 to destroy the contents of the memory 30, thus making it impossible to be used. Accordingly, in this case, the printing operation cannot be carried out until the print cartridge is exchanged with new one.

If it is determined in step 4 that any of P(n), S(n) and G(n) does not reach the set value, the process proceeds to step 7, in which the control means 32 determines whether any of P(n), S(n) and G(n) reaches the set value for "2nd warning". If at least one of them reaches the set value, the process proceeds to step 8 and the message "2nd warning" is output and displayed on the display means 35.

If it is determined in step 7 that any one of P(n), S(n) and G(n) does not reach the set value for "2nd warning", the process proceeds to step 9, in which the control means 32 determines whether any of P(n), S(n) and G(n) reaches the set value for "warning". If at least one of them reaches the set value, the process proceeds to step 8 and the message "1st warning" is output and displayed on the display means 35.

After completing step 8 or 10, or in the case where any one of P(n), S(n) and G(n) does not reach the set value for "1st warning", the process proceeds to step 11 and the apparatus is on stand-by. If printing is carried out in step 12, the new cumulative number of printed sheets P(n+m) counted by the counter 33a of the record control component 13a in step 13 is transmitted to the control means 32, and the process proceeds to step 14.

In step 14, it is determined whether the cumulative number of printed sheets P(n+m) which has been counted reaches the set value for "End of life" 50,000 and if it is determined to reach the set value, the process returns to steps 5 and 6. If it is determined in step 14 that the cumulative number of printed sheets does not reach the set value for "End of life", the process proceeds to step 15. In step 15, it is determined whether the cumulative number of printed sheets P(n+m) reaches the set value for "2nd warning" 45,000, and if it reaches, the process proceeds to step 16 to output and display the message of "2nd warning" on the display means 35. If it is determined in step 15 that P(n+m) does not reach the set value for "2nd warning" the process proceeds to step 17, where determination is made as to whether P(n+m) reaches the set value for "1st warning" 40,000, and if it reaches, the process proceeds to step 18 and the message of "1st warning" is output and displayed on the display means 35.

After completing steps 16 or 18, or in the case where P(n+m) does not reach the set value for "1st warning" in step 17, the process proceeds to step 19. In step 19, the new number of rotation of the image formation member S(n+m) counted by the counter 33b of the drive control component 13b is transmitted to the control means 32, and the process proceeds to step 20.

In step 20, it is determined whether the counted number of rotation of the image formation member S(n+m) reaches the set value for "End of life" 171,000, and if it is determined to reach the set value, the process proceeds to steps 5 and 6. If it is determined in step 20 that S(n+m) does not reach the set value, the process proceeds to step 21, where determination is made as to whether S(n+m) reaches the set value for "2nd warning" 154,000, and in the case of reaching the set value, the process proceeds to step 16 and the message of "2nd warning" is output and displayed on the display means 35. If S(n+m) is determined not to reach the set value for "2nd warning" in step 21, the process proceeds to step 22, where it is determined whether S(n+m) reaches the set value for "1st warning" 137,000. If it is determined that S(n+m) reaches the set value, the process proceeds to step 18 to output and display the message of "1st warning" on the display means 35.

After completing steps 20 or 21, or in the case where S(n+m) does not reach the set value for "notice" in step 22, the process proceeds to step 23. In step 23, the new number of pixels of image information G(n+m) counted by the counter 33c of the image signal processing component 13c is transmitted to the control means 32, and the process proceeds to step 24.

In step 24, determination is made as to whether the counted number of pixels of image information G(n+m) reaches the set value for "life expiration" $53 \times 10^8$ and if it is determined to reach the set value, the process proceeds to steps 5 and 6. In the case where it is determined in step 24 that G(n+m) does not reach the set value for "life expiration" the process proceeds to step 25, where determination is made as to whether G(n+m) reaches the set value for "caution" $47.7 \times 10^8$. If it is determined that G(n+m) reaches the set value, the process proceeds to step 16 and the message of "caution" is output and displayed on the display means 35. If it is determined in step 25 that G(n+m) does not reach the set value, the process proceeds to step 26, where determination is made as to whether G(n+m) reaches the set value for "notice" $42.4 \times 10^8$. If it is determined to reach the set value, the process proceeds to step 18 and the message of "notice" is output and displayed on the display means 35.

After completing steps 24 or 25, or in the case where G(n+m) does not reach the set value for "1st warning" in step 26, the process proceeds to step 27. In step 27, each of the above-described cumulative number of printed sheets P(n+m), the cumulative number of rotation of the image formation member S(n+m), and the cumulative number of pixels of image information G(n+m) is subtracted from the criterial value of the life of the cartridge (which has been initially stored in the memory 30), and the values obtained here are stored in the main memory 34 as latest information related to the life of the cartridge. In step 28, latest information related to the life of the cartridge operated in step 27 is written in the memory 30 of the cartridge 20 by the reading/writing means 31.

Thus the life of the print cartridge is managed at all times by three factors, namely, the number of printed sheets, the number of rotation of the image formation member, and the number of pixels of image information, and even if the apparatus is used in a particular way, the life of the cartridge can be appropriately detected. That is, even in the particular way of use, the life of the cartridge is securely detected before fogging occurs or collected toner overflows the storing component of the image formation member. These three factors/informations are always stored in the memory while a single cartridge is used without changing; therefore, detection or management of life of the cartridge is exactly carried out. On the other way, in the case where the cartridge is exchanged with a different or new one, three factors/informations inherent to each of these cartridges are stored, and accordingly detection of the life of the cartridge can be exactly carried out.

Since exchange of the cartridge is recommended with the display of status by stages as the life expiration of the cartridge draws near, the sufficient time for preparation of new cartridge and exchanging with it can be obtained.

Furthermore, if the life of the print cartridge expires before the number of printed sheets reaches 50,000, which is regarded as an intrinsic life of the cartridge owing to factors in a particular way of use, information (history) related to the life of the cartridge is stored in the main memory 34; therefore, compensation for remaining sheets can be made to the user.

In the above embodiment, the case where the used toner is collected in the storing component of the image formation member is taken as an example, but the present invention can also be applied to an apparatus in which used toner is collected in an ordinary used toner collecting container.

As described above, according to the present invention, even if the apparatus is used in a particular way, the life of the cartridge can be appropriately detected before problems of the image quality occur because the life of the print cartridge is detected based on plural criterial informations, which make management/exchange of the cartridge more securely. Therefore, defect in the image quality or apparatus contamination which has conventionally occurred in a particular way of use can be avoided beforehand by employing the system of the present invention, and there is no fear of bothering the user with such problems.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A cartridge life detecting system which detects and manages the life of a cartridge by mounting a memory on a print cartridge comprising at least an image formation member removably mounted on a main body of an image formation apparatus, carrying out operation to obtain information about the life of said cartridge based on contents read from said memory and criterial information of the life of said cartridge, and writing said information about the life in said memory, comprising the steps of:

setting a value corresponding to the life of said cartridge by selecting one of a) combination of the number of printed sheets and the number of rotations of said image formation member, combination b) of the number of printed sheets and the number of pixels of image information, and c) combination of the number of printed sheets, the number of rotations of said image formation member and the number of pixels of image information;

storing said value in said memory in advance; and making determination as to the life of said cartridge based on said value.

2. The cartridge life detecting system according to claim 1, wherein the number of rotation of said image formation member is set based on a minimum film thickness of said image formation member necessary for maintaining image quality.

3. The cartridge life detecting system according to claim 1, wherein the number of pixels of said image information is set based on an acceptable amount of collected toner.

* * * * *

UNITED STATES PATENT AND TRADEMARK OFFICE
CERTIFICATE OF CORRECTION

PATENT NO. : 5,572,292
DATED : November 05, 1996
INVENTOR(S) : Kiyoshi CHATANI et al.

It is certified that error appears in the above-indentified patent and that said Letters Patent is hereby corrected as shown below:

Claim 1, Column 10, Line 16, "combination b)" should read -- b) combination--.

Signed and Sealed this

Twenty-fifth Day of February, 1997

Attest:

BRUCE LEHMAN

*Attesting Officer*   *Commissioner of Patents and Trademarks*